United States Patent [19]

Bisson et al.

[11] 4,013,376

[45] Mar. 22, 1977

[54] COOLABLE BLADE TIP SHROUD

[75] Inventors: Bernard Joseph Bisson, Winsted; Loren Hawdon White, East Hartford, both of Conn.

[73] Assignee: United Technologies Corporation, Hartford, Conn.

[22] Filed: June 2, 1975

[21] Appl. No.: 583,140

[52] U.S. Cl. ................................ 415/117; 415/139

[51] Int. Cl.² ...................... F02C 7/18; F01D 25/12

[58] Field of Search .......... 415/115, 116, 117, 174, 415/178, 134, 138, 139, 110

[56] References Cited

UNITED STATES PATENTS

| | | | |
|---|---|---|---|
| 2,863,634 | 12/1958 | Chamberlin | 415/134 |
| 3,365,172 | 1/1968 | McDonough | 415/117 |
| 3,412,977 | 11/1968 | Moyer | 415/135 |
| 3,728,039 | 4/1973 | Plemmons | 415/178 |
| 3,728,041 | 4/1973 | Bertelson | 415/172 A |
| 3,752,598 | 8/1973 | Bowers et al. | 415/173 R |

*Primary Examiner*—Carlton R. Croyle
*Assistant Examiner*—L. J. Casaregola
*Attorney, Agent, or Firm*—Robert C. Walker

[57] ABSTRACT

A coolable shroud surrounding the tips of the turbine blades of a gas turbine engine is disclosed. The shroud comprises a plurality of arcuate segments which are supported by the turbine case concentrically about the axis of the engine in end to end relationship. Each segment is adapted to receive and distribute cooling air about the walls of the shroud which are exposed to the hot working medium gases flowing through the turbine during operation of the engine. A combination of impingement cooling and transpiration cooling techniques maximize the cooling effectiveness of the air supplied.

2 Claims, 3 Drawing Figures

COOLABLE BLADE TIP SHROUD

The invention herein described was made in the course of or under a contract with the Department of the Navy.

BACKGROUND OF THE INVENTION

1. Field of the Invention

This invention relates to gas turbine engines and more particularly to engines having a shroud surrounding the tips of the rotor blades in the turbine section of the engine.

2. Description of the Prior Art

In a gas turbine engine of the type referred to above, pressurized air and fuel are burned in a combustion chamber to add thermal energy to the medium gases flowing therethrough. The effluent from the chamber comprises high temperature gases which are flowed downstream in an annular flow path through the turbine section of the engine. Nozzle guide vanes at the inlet to the turbine direct the medium gases onto a multiplicity of blades which extend radially outward from the engine rotor. An annular shroud which is supported by the turbine case surrounds the tips of the rotor blades to confine the medium gases flowing thereacross to the flow path. The clearance between the blade tips and the shroud is minimized to prevent the leakage of medium gases around the tips of the blades.

A limiting factor in many turbine engine designs is the maximum temperature of the medium gases which can be tolerated in the turbine without adversely limiting the durability of the individual components. The shrouds which surround the tips of the rotor blades are particularly susceptible to thermal damage and a variety of cooling techniques is applied to control the temperature of the material comprising the shroud in the face of high turbine inlet temperatures. In many of these techniques air is bled from the compressor through suitable conduit means to the local area to be cooled. Compressor air is sufficiently high in pressure to cause the air to flow into the local area of the turbine without auxiliary pumping and is sufficiently low in temperature to provide the required cooling capacity.

Most recently, considerable design effort has been expended to minimize the amount of air consumed for cooling of the turbine components. Impingement cooling is one of the more effective techniques utilized and occurs where a high velocity air stream is directed against a component to be cooled. The high velocity stream impinges upon a surface of the component and increases the rate of heat transfer between the component and the cooling air. A second highly effective but not as widely utilized technique is that of transpiration cooling. A cooling medium is allowed to exude at low velocities through a multiplicity of tiny orifices in the wall of the component to be cooled. The low velocity flow adheres to the external surface of the component and is carried axially downstream along the surface by the working medium gases flowing thereacross.

One typical application of transpiration cooling to blade tip shrouds is shown in U.S. Pat. No. 3,365,175 to McDonough et al entitled "Air Cooled Shroud Seal". In McDonough et al a single cooling air chamber extends circumferentially about the outer periphery of the shroud. Cooling air is flowable to the chamber from the compressor section of the engine through suitable supply means to convectively cool the shroud material. At least a portion of the cooling air in McDonough et al is further flowable to the inner periphery of the shroud through cooling holes of small diameter to introduce cool air into the boundary layer of the hot gas stream adjacent the shroud. One embodiment of McDonough et al, has a multiplicity of grooves or recesses at the inner periphery of the shroud which intercept the cooling holes and prevent the closure of the holes should the blade tips rub against the shroud during operation of the engine. In transpiration cooling the exuding velocities must remain low in order to prevent over penetration of the working medium gases by the cooling air. Over penetration interrupts both the flow of cooling air and the flow of medium gases and renders the cooling ineffective. A preferred pressure ratio across the cooled wall in most transpiration cooled embodiments is approximately 1.25. The effectiveness of a transpiration cooled construction is highly sensitive to variations from the designed pressure ratio across the surface to be cooled; accordingly, the pressure ratio must be closely controlled.

Both cooled and uncooled shrouds are commonly segmented where large variations in thermal expansion between the shroud and its supporting turbine case are expected. A circumferential gap between adjacent segments is provided to allow independent expansion of the case and shroud segments without inducing local stresses. In this type of construction a portion of the medium gases inherently leaks axially through the gap from the upstream to the downstream region of the shroud. A reduction in the amount of leaking gases is effected by providing interlocking lugs at the abutting ends of adjacent segments. U.S. Pat. No. 3,412,977 to Moyer et al entitled "Segmented Annular Sealing Ring and Method of its Manufacture" shows a shroud having conventionally interlocking lugs. In addition to the interlocking lugs, shroud constructions which are both segmented and cooled require radial sealing means to prevent the wasteful leakage of cooling air from the air chamber into the medium flow path through the gap between adjacent segments. To be effective the radial sealing means must necessarily have a capability for sealing a gap which varies in width according to divergent thermal conditions.

The individual use of the above described cooling techniques and sealing means, although successful in prolonging the life of the turbine components, have proved inadequate to meet todays requirement for durable, high performance engines. More effective ways of utilizing a diminished quantity of cooling air must be found.

SUMMARY OF THE INVENTION

A primary object of the present invention is to improve the performance and durability of a gas turbine engine through the judicious use of cooling air to the shroud which surrounds the tips of the rotor blades in the turbine section of the engine.

According to the present invention, an annular shroud which surrounds the tips of the turbine blades in a gas turbine engine comprises a plurality of arcuate segments each having a sealing surface and two or more parallel chambers which extend circumferentially beneath the sealing surface and are adapted to receive and distribute cooling air about the surface.

A primary feature of the present invention is the axially adjacent chambers which are disposed beneath the sealing surface of each arcuate segment. A baffle plate separates each member from a common cooling air supply cavity. Orifices in the plate are sized and spaced to flow cooling air into each chamber at a velocity which is sufficient to cause the air to impinge upon the opposing wall. Transpiration cooling holes in each shroud segment are sized and spaced to flow cooling air to the sealing surface of each shroud at velocities which will enable the exuding flow to adhere to the sealing surface. Interlocking lugs at the ends of the adjacent seal segments are engaged to prevent the axial flow of medium gases from the upstream to the downstream region between the adjacent segments. Hemispherical indentations in the sealing surface prevent closure of the transpiration cooling holes should the shroud be struck by the passing blade tips. Radial sealing means are provided between adjacent segments of the shroud. In one embodiment air is injected into the gaps between the interlocking lugs to cool the region and to prevent the circulation of working medium gases around the blade tips as the tips pass over the gaps between adjacent sealing surfaces.

A principal advantage of the present invention is the improved utilization of the cooling air which is made possible by the effective combination of transpiration and impingement cooling techniques in each shroud segment. A nearly uniform pressure ratio between each chamber and the adjacent portion of the working medium flow path reduces the wasteful flow of excessive cooling air into the medium flow path and improves the adhereance of the transpiration cooling air to the sealing surfaces of the shroud with minimal penetration of the working medium. The performance of the engine is improved by the addition of radial sealing means which reduce the leakage of cooling air from the supply cavity, and by the interlocking lugs which reduce the axial leakage of working medium gases across the shroud.

The foregoing, and other objects, features and advantages of the present invention will become more apparent in the light of the following detailed description of the preferred embodiment thereof as shown in the accompanying drawing.

DESCRIPTION OF THE PREFERRED EMBODIMENT

Figure 1:
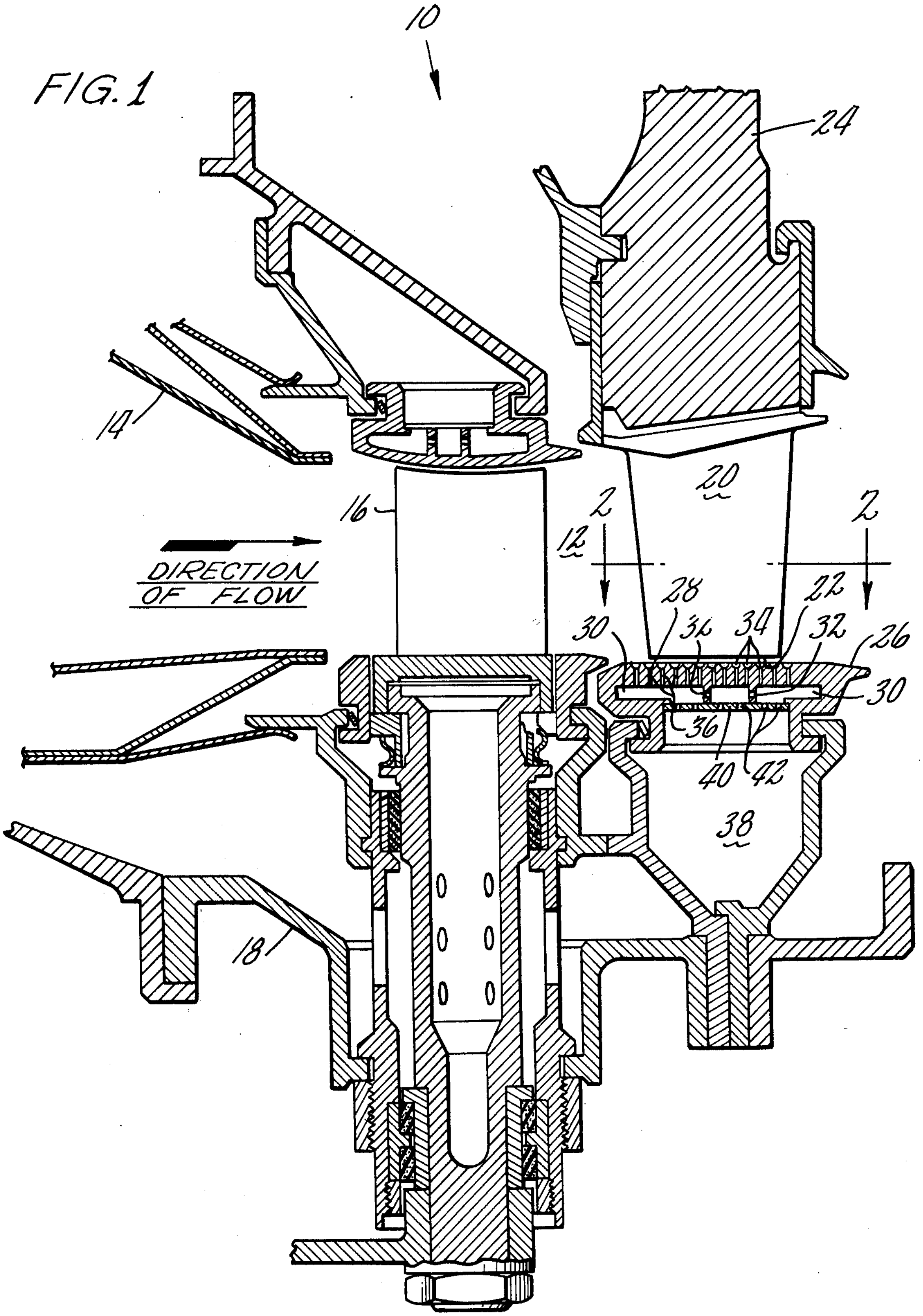
FIG. 1 is a cross section view showing a shroud surrounding the tips of the blades in the turbine section of an engine.

A portion of gas turbine engine having a turbine section 10 is shown in FIG. 1. The turbine section has an annular flow path 12 extending axially downstream from a combustion chamber 14. Disposed across the flow path is a nozzle guide vane 16 which is cantilevered from a turbine case 18 and is rotatable in the embodiment shown. A plurality of the vanes 16 is spaced circumferential within the flow path at the location shown. Each vane 16 directs a portion of the working medium gases into a turbine blade 20 which has a tip 22 and extends radially outward from an engine rotor 24. A multiplicity of the blades 20 are located at the same axial position shown. The blades are radially enclosed by a shroud 26 which has a sealing surface 28 opposing the tips of the blades and two or more parallel chambers 30 separated by ribs 32 which extend circumferentially beneath the sealing surface. The sealing surface has a multiplicity of hemispherical indentations 34 which are communicatively joined to respective chambers by transpiration cooling holes 36. Disposed between the chambers and a cooling air supply cavity 38 is a baffle plate 40 having a plurality of impingement orifices 42. Conduit means which are not specifically shown supply air to the cavity 38.

Figure 2:
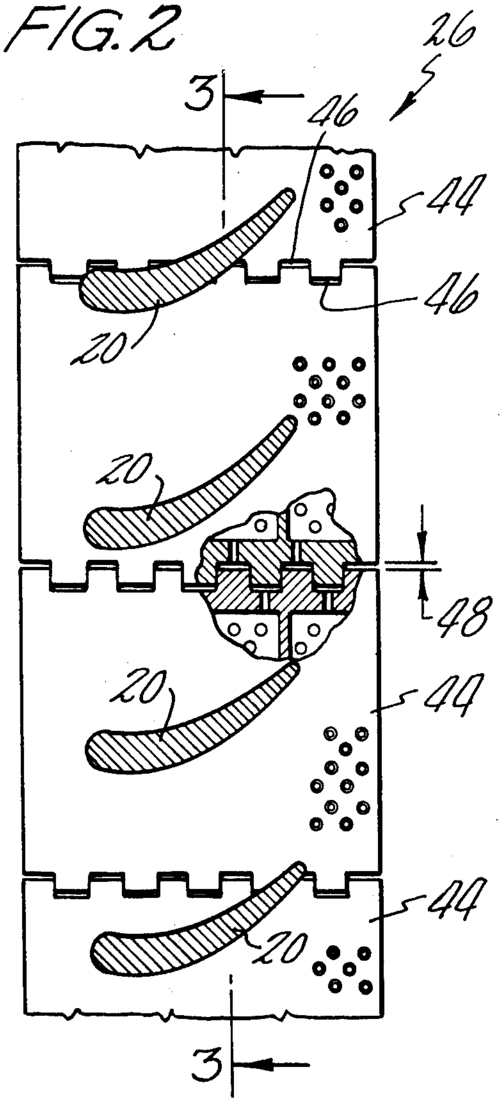
FIG. 2 is a sectional view taken along the line 2—2 as shown in FIG. 1.

As is shown in FIG. 2, the shroud 26 comprises a plurality of segments 44 having interlocking lugs 46 which extend from the abutting ends of each segment. Between each pair of adjacent segments is a circumferential gap 48. The gap includes a triangularly shaped slot 50 as shown in the FIG. 3 sectional view. Disposed within the slot 50 is a correspondingly shaped seal member 52. One or more lug holes 54 extend from the chambers to the gap region.

During operation of the engine pressurized air and fuel are burned in the combustor 14 and flowed axially downstream in the flow path 12 through the turbine section of the engine. In the region adjacent the shroud 26, the pressure of the working medium gases in a typical engine at takeoff decreases from approximately 175 pounds per square inch to approximately 100 pounds per square inch. The maximum local temperature of the medium gases in the corresponding area remains approximately 3400° Fahrenheit. The shrouds of the downstream stages are exposed to reduced temperatures and pressures but may also advantageously employ the concepts disclosed herein.

The combination of impingement cooling and transpiration cooling techniques, as employed in the present embodiment, prevents the wasteful allotment of cooling capacity to regions of lower temperature and pressure while maintaining the temperature of the material comprising the shroud at a level consonant with durable operation of the turbine. Cooling air from the compressor section of the engine, which is sufficiently high in pressure to cause the air to flow into the local area of the turbine without auxiliary pumping and is sufficiently low in temperature to provide the required cooling capacity, is first flowable to the air supply cavity 38 through conduit means which are not specifically shown. The conduit means are either external to the turbine case 18 or contained therein. Air from the cavity 38 is directed by the orifices 42 in the baffle plate 40 into the parallel chambers 30 and against the opposing wall of each chamber. In most preferred constructions, a pressure ratio across the baffle plate within the range of 1.1 to 1.85 is sufficient to cause the air passing thereacross to impinge upon the opposing wall. The impinging flow establishes a heat transfer rate between the shroud material and the cooling medium which is substantially greater than that obtainable with conventional convective cooling.

The cooling air is further flowable from the chambers 30 to the sealing surface 28 of the shroud 26 through the transpiration cooling holes 36. A pressure ratio across the shroud in most preferred constructions of approximately 1.25 produces exit velocities from the holes 36 which are sufficiently low to permit the air flowing therethrough to adhere to the sealing surface 28. The low air velocities prevent over penetration of the working medium gases by the cooling air which would interrupt both the flow of cooling air and the flow of medium gases and render the cooling technique ineffective. The holes 36 may be perpendicular to the sealing surface 28 or may be slanted in the direction of flow thereacross to increase the likelihood that the cooling air will adhere to the sealing surface. Hemispherical indentations 34 in the sealing surface intersect the holes 36 and further reduce the velocity of the exuding flow while preventing closure of the holes in the event that the shroud is struck by the passing blade tips during operation of the engine.

Figure 3:
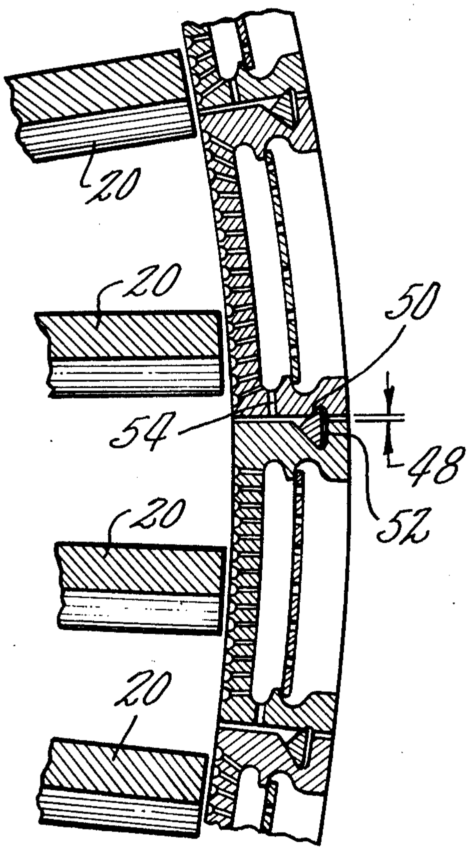
FIG. 3 is a sectional view taken along the line 3—3 as shown in FIG. 2.

The circumferential gap 48 between each pair of adjacent shroud segments is sized to accommodate the maximum differential thermal expansion between the shroud 26 and the supporting turbine case 18. The interlocking lugs 46, which extend circumferentially from each shroud segment, block the axial flow of working medium gases through the gap 48 as is shown in FIGS. 2 and 3. The lug holes 54 supply air to the gap region which aerodynamically fills the gap to maintain continuity of the sealing surface between adjacent segments.

The radial leakage of excessive cooling air across the gap 48 from the supply cavity 38 to the flow path 12 is prevented by the seal 52 which is disposed within the triangularly shaped slot 50. The differential pressure between the cavity 38 and the flow path 12 urges the seal against the radially inward apex of the slot. Regardless of the size of the gap 48 as established by the engine thermal condition, the slot 50 retains its triangular shape and the seal 52 remains functionally effective at the apex.

Although the invention has been shown and described with respect to a preferred embodiment thereof, it should be understood by those skilled in the art that the concepts disclosed herein are additionally applicable to other engine components such as the vane inner diameter shroud shown in FIG. 1. Other various changes and omissions in the form and detail thereof may be made therein without departing from the spirit and the scope of the invention.

Having thus described a typical embodiment of our invention, that which we claim as new and desire to secure by Letters Patent of the United States is:

1. A shroud, which surrounds a portion of the flow path for the working medium gases in the turbine section of a gas turbine engine, comprising:

a plurality of arcuate segments disposed in end to end relationship wherein each arcuate segment has a plurality of lugs which interlock with corresponding lugs from the adjacent segment and wherein each pair of adjacent segments forms therebetween a substantially triangular shaped groove, the segments forming a sealing surface, having a multiplicity of cooling holes disposed therein, and including a plurality of axially adjacent chambers which extend circumferentially beneath the sealing surface;

a sealing member disposed within each of said triangular shaped grooves to inhibit the flow of fluid medium between the adjacent segments; and baffle means, including a plurality of orifices incorporated therein, which is disposed across one side of each chamber of the arcuate segments, wherein the cooling holes of the sealing surface and orifices of the baffle means are sized and spaced to provide a substantially uniform pressure ratio across the sealing surface during operation of the engine.

2. The invention according to claim 1 wherein said sealing member is a bar having a substantially triangular cross section.

* * * * *